United States Patent
Moineau et al.

(10) Patent No.: US 9,006,363 B2
(45) Date of Patent: Apr. 14, 2015

(54) PROCESS FOR THE ACTIVATION OF A SUPPORTED CHROMIUM OXIDE BASED CATALYST

(75) Inventors: Christophe Moineau, Nivelles (BE); Stephan Detournay, Strombeek-Bever (BE)

(73) Assignee: Ineos Sales (UK) Limited, Lyndhurst, Hampshire (GB)

( * ) Notice: Subject to any disclaimer, the term of this patent is extended or adjusted under 35 U.S.C. 154(b) by 30 days.

(21) Appl. No.: 13/879,681

(22) PCT Filed: Oct. 5, 2011

(86) PCT No.: PCT/EP2011/067363
§ 371 (c)(1),
(2), (4) Date: Apr. 16, 2013

(87) PCT Pub. No.: WO2012/059289
PCT Pub. Date: May 10, 2012

(65) Prior Publication Data
US 2013/0203947 A1 Aug. 8, 2013

(30) Foreign Application Priority Data

Nov. 1, 2010 (EP) .................................... 10189544

(51) Int. Cl.
| | | |
|---|---|---|
| *C08F 4/24* | (2006.01) | |
| *C08F 10/02* | (2006.01) | |
| *C08F 210/02* | (2006.01) | |
| *C08F 210/16* | (2006.01) | |
| *C08F 110/02* | (2006.01) | |

(52) U.S. Cl.
CPC . *C08F 4/24* (2013.01); *C08F 10/02* (2013.01); *C08F 110/02* (2013.01); *C08F 210/02* (2013.01); *C08F 210/16* (2013.01)

(58) Field of Classification Search
CPC .............. C08F 10/00; C08F 4/69; C08F 4/24; B01J 8/1809; B01J 8/1818
See application file for complete search history.

(56) References Cited

FOREIGN PATENT DOCUMENTS

| EP | 2 172 490 A1 | 4/2010 |
|---|---|---|
| WO | WO 03/033550 A1 | 4/2003 |
| WO | WO 2009/097379 A1 | 8/2009 |

OTHER PUBLICATIONS

USPTO Office Communication dated Mar. 4, 2014, together with a Third-Party Submission under 37 CFR 1.290, filed Feb. 25, 2014 in connection with co-pending U.S. Appl. No. 13/879,725, 19 pgs.
Specification of co-pending National Phase U.S. Appl. No. 13/879,725, filed Apr. 16, 2013, (PCT Int'l Application No. PCT/EP2011/067368, WO 2012/059290 A1, filed Oct. 5, 2011); 25 pgs.

*Primary Examiner* — Ling Choi
*Assistant Examiner* — Catherine S Branch
(74) *Attorney, Agent, or Firm* — Nixon & Vanderhye P.C.

(57) ABSTRACT

Process for the activation of a supported chromium oxide based catalyst in a fluidized bed activation reactor which has a catalyst bed being fluidized by a fluidization gas. The activation includes treatment at temperatures above 500° C., in which in an initial stage, where there is an initial temperature increase, the fluidization velocity (Vf1) of the fluidization gas is maintained below 6.5 centimeters per second (cm/sec) until the temperature inside the activation reactor reaches at least 200° C., and the fluidization gas is then brought to a value (Vf2) which is at least 1 cm/sec higher than Vf1.

25 Claims, No Drawings

PROCESS FOR THE ACTIVATION OF A SUPPORTED CHROMIUM OXIDE BASED CATALYST

This application is the U.S. national phase of International Application No. PCT/EP2011/067363 filed 5 Oct. 2011 which designated the U.S. and claims priority to European Patent Application No. 10189544.9 filed 1 Nov. 2010, the entire contents of each of which are hereby incorporated by reference.

The present invention relates to a process for the activation of a supported chromium oxide based catalyst.

In particular, the present invention relates to a process for polymerisation of olefins, in particular gas phase polymerisation of olefins, with the aid of a supported chromium oxide based catalyst.

More particularly, the present invention relates to a process for polymerisation of olefins, in particular gas phase polymerisation of olefins, with the aid of a supported chromium oxide based catalyst which has been subjected to an improved activation method.

WO2008074467 discloses a process for producing chromium catalysts, comprising the steps of: a) applying one or more chromium compound(s) to a finely divided inorganic support to form a catalyst precursor, b) thermally treating the catalyst precursor, the step of thermally treating the catalyst precursor being carried out for at least part of the time in an oxidizing atmosphere and in such a manner that a maximum temperature of from 350° C. to 1050° C. is not exceeded, wherein the duration of the thermal treatment step at a temperature of above 300° C. is at least 1500 minutes.

M. P. McDaniel et al. have published an article (Applied Catalysis A: General 335 (2008) 252-261) which reports attempts to define the underlying principles governing activation of the Phillips chromium/silica catalyst during fluid bed calcining. This study concentrates on the effect of moisture over the stability of the hexavalent chromium during the activation; catalyst charge weight, fluidisation gas velocity and temperature ramp rate are identified as the three major activation variables influencing the concentration of moisture.

Whilst, as exemplified by the prior art in the field, it is common general knowledge to produce polymers in gas phase in the presence of supported chromium oxide based catalyst, the man skilled in the art is still trying to obtain polymers with the right combination of product properties, particularly properties appropriate for pipe purposes, while still having a high productivity and avoiding production problems, e.g. fines and/or temperature upsets. Therefore, it would be desirable to obtain a resin product with desirable properties, e.g., for pipe, good balance of properties between environmental stress crack resistance (ESCR), creep behaviour, resistance against rapid crack propagation and rheological behavior, for film, good balance of properties between bubble stability, impact resistance, tear strength and for blow moulding, good balance of properties between ESCR, impact resistance and rheological behavior, while also achieving high catalyst activity and high production rate, in particular using a gas phase process, more particularly a fluidized bed gas phase process.

It is therefore an objective of the present invention to provide a process for preparing ethylene (co-) polymers, preferably in gas phase, having the good balance of properties as described above in the presence of a supported chromium oxide based catalyst having good activity.

Such objective has proven to be a very difficult challenge despite all the research efforts made by the Applicants over the past years. In the course of said research efforts, and in particular in the course of using preferred two-step activation procedures (by which a supported chromium oxide based catalyst is subject to a single activation in two steps as further described in general terms, for example, in McDaniel "A Review of the Phillips Supported Chromium Catalyst and Its Commercial Use for Ethylene Polymerization" in Advances in Catalysis, Vol. 53, Chapter 3, Section 12.4 "Commercial Practice" or in U.S. Pat. No. 4,147,849) in a commercial fluidised bed reactor, the Applicants have encountered critical catalyst fragmentations issues.

It is therefore an additional objective of the present invention to provide a process for preparing ethylene (co-) polymers, preferably in gas phase, in the presence of a supported chromium oxide based catalyst which does not suffer from said fragmentation problems.

The subject of the present invention is therefore a process for the activation of a supported chromium oxide based catalyst in a fluidised bed activation reactor which comprises a catalyst bed being fluidised by a fluidisation gas, said activation including treatment at temperatures above 500° C., characterised in that the fluidisation velocity (Vf1) of the fluidisation gas is initially maintained below 6.5 centimeters per second (cm/sec), preferably below 6 cm/sec, more preferably below 5.5 cm/sec, even more preferably below 5 cm/sec until the temperature inside the activation reactor reaches at least 200° C., and said fluidisation gas is then brought to a value (Vf2) which is at least 1 cm/sec higher than Vf1.

Whilst not wishing to be bound by this theory, the Applicants believe that the combination of a lower and higher fluidisation velocities together with a strict control of the fluidisation velocity during the initial temperature increase inside the fluidisation bed activation reactor conferred to the catalyst unique properties, e.g. no fragmentation at all during the gas phase polymerisation of olefins in the presence of said catalyst.

Additionally, the subject of the present invention is a process for the polymerisation, preferably the gas phase polymerisation, of at least one alpha olefin containing from 2 to 12 carbon atoms in the presence of a supported chromium oxide based catalyst which has been subjected to an activation treatment in a fluidised bed activation reactor which comprises a catalyst bed being fluidised by a fluidisation gas at temperatures above 500° C. characterised in that the fluidisation velocity (Vf1) of the fluidisation gas is initially maintained below 6.5 centimeters per second (cm/sec), preferably below 6 cm/sec, more preferably below 5.5 cm/sec, even more preferably below 5 cm/sec until the temperature inside the activation reactor reaches at least 200° C., and said fluidisation gas is then brought to a value (Vf2) which is at least 1 cm/sec higher than Vf1.

The Applicants have unexpectedly discovered that the fragmentation problems encountered with the prior art methods could be overcome by actively controlling the fluidisation gas velocity during the initial thermal treatment of the supported chromium oxide based catalyst. Indeed, keeping the fluidisation gas velocity at low levels for a certain period of time during the initial thermal treatment step of the raw supported chromium oxide based catalyst before increasing said velocity to a higher value has proven to be critical for obtaining the final polymer exhibiting the desired product properties whilst overcoming the prior art catalyst fragmentation problems.

According to a preferred embodiment of the present invention, the above control of fluidisation velocity during the initial stage of the activation process is maintained until the temperature inside the activation reactor reaches 250° C., preferably 300° C.; it can also advantageously be maintained correspondingly until 400° C. or 500° C. or even 600° C.

According to a preferred embodiment of the present invention, the fluidisation velocity during the initial stage of the activation process is maintained above 1.5 cm/s, preferably above 2 cm/s.

The fluidisation gas used during the initial stage of the activation process can advantageously be chosen amongst inert gases, e.g. nitrogen, and/or oxidising gases, e.g. air, or sequentially an inert gas followed by an oxidising gas; an inert gas is preferably used as fluidisation gas during this initial activation stage.

According to an embodiment of the present invention, the catalyst bed activated according to the present invention has a height at rest of at least 0.5 meter, preferably at least 1 meter, more preferably at least 1.5 meter. Indeed, the Applicants have found in the course of their developments that the control of the fluidisation velocity of the fluidisation gas during the initial stage of the activation inside their commercial fluidised bed activation reactor was critical. This finding was unexpected because the same problem/solution is not applicable to small scale activators e.g. laboratory scale activators wherein a very broad ranges of fluidisation gas velocities can be used during the catalyst activation without exhibiting any significant differences in the final properties of the activated catalyst. This is why the man skilled in the art concentrated his studies over the past decades on the temperature, the temperature ramps, the temperature holding times and the nature of the fluidisation gas. For commercial scale activators, the man skilled in the art usually recommended to use fluidisation gas velocities much beyond 6 cm/s, preferably at least 9 cm/sec in order to guarantee an appropriate fluidisation of the bed.

The initial fluidisation stage of the activation process according to the present invention is then followed by at least another fluidisation stage which is performed on the same catalyst bed in the same activation reactor with a fluidisation gas wherein said fluidisation gas is brought to a value (Vf2) which is at least 1 cm/sec higher than Vf1. Said fluidisation velocity Vf2 is preferably at least 1.5 cm/sec higher than Vf1, more preferably at least 2 cm/sec higher than Vf1.

The fluidisation gas used during this consecutive stage of the activation process can advantageously be chosen amongst inert gases, e.g. nitrogen, and/or oxidising gases, e.g. air, or sequentially (and preferably) an inert gas followed by an oxidising gas.

Said consecutive fluidisation stage preferably includes thermal treatments with holding temperatures higher than 500° C., preferably higher than 600° C.

Said consecutive fluidisation stage thus preferably comprises the use of a fluidisation velocity Vf2 which is at least 1 cm/sec higher than Vf1. Said fluidisation velocity Vf2 is preferably at least 1.5 cm/sec higher than Vf1, more preferably at least 2 cm/sec higher than Vf1. Vf2 is preferably of at least 6 cm/s, preferably at least 7 cm/s, for example at least 8 cm/s. In order to avoid entrainments or excessive turbulences inside the activation reactor, said fluidisation gas velocity is usually maintained below 12 cm/s, preferably below 11 cm/s, for example below 10 cm/s.

The duration of the initial fluidisation stage according to the present invention is not critical but preferably lasts at least 10 minutes, preferably at least 1 hour, more preferably at least 3 hours, for example at least 8 hours.

The duration of the consecutive fluidisation stage according to the present invention is not critical but preferably lasts at least 10 minutes, preferably at least 1 hour, more preferably at least 3 hours, for example at least 8 hours.

According to a preferred embodiment of the present invention, the consecutive fluidisation stage (i.e. the fluidisation stage performed at a higher fluidisation velocity) comprises at least two separate thermal treatment steps wherein
  the first step consists in bringing the catalyst from the initial stage under an inert atmosphere to a temperature comprised between 600 and 900° C. and then keeping the catalyst during a holding time of less than or equal to 8 hours under an inert atmosphere at a temperature comprised between 600 and 900° C., and
  the second step consists in the treatment of the catalyst coming from step 1 under an oxidizing atmosphere, preferably air, at a temperature comprised between 400 and 700° C. during a holding time comprised between 2 and 10 hours, and
  wherein the maximum temperature of step 2 is always lower than the maximum temperature of step 1 and wherein the difference between the maximum temperature of step 1 and the maximum temperature of step 2 is comprised between 50 and 250° C.

The present invention has proven to be particularly useful when the supported chromium oxide based catalyst is a titanium modified supported chromium oxide based catalyst.

According to a preferred embodiment of the present invention, the raw catalyst or the activated catalyst itself is not contacted with an alkylboron compound before or during (co-) polymerization. Thus, preferably, the present invention does not contemplate the activation of our catalyst by a cocatalyst such as with an alkylboron.

The refractory oxide support for the chromium oxide based catalyst used in the process of the present invention is preferably a spherical and/or spheroidal refractory oxide. It can preferably be silica, alumina, aluminophosphate, metal oxides such as oxides of titanium, zirconium, boron, zinc, magnesium, and the like, or combinations thereof; more preferably, it essentially consists of silica or more preferably silica doped with titanium, aluminium or boron.

The spherical and/or spheroidal refractory oxide support may suitably be prepared by spray drying of washed and aged hydrogel particles or spray setting of a hydrosol. Such processes are well known in the art and typically result in spherical and/or spheroidal particles. The particle size may be adjusted by selection of conditions. In this invention the median (volume) particle diameter of the spherical and/or spheroidal particles measured after drying is from 10 to 250 µm, preferably from 20 to 200 µm and most preferably from 20 to 150 µm. The International Standard ISO 13320:2009 ("Particle size analysis—Laser diffraction methods") can be used for measuring said median particle size characteristic. Particle diameters are indeed typically measured using light scattering techniques. For example, Malvern Instruments' laser diffraction systems can advantageously be used, e.g. a Malvern Mastersizer S or a Malvern Mastersizer 2000; such instrument together with its operating manual meets or even exceeds the requirements set-out within the ISO 13320 Standard; the Malvern wet dispersion procedure (Qspec Large volume sample dispersion unit) is preferably used. The resulting spherical and/or spheroidal particles may be further classified e.g. by sieving to tailor the median particle diameter and reduce the amounts of fine and/or coarse particles.

Although handling of the particles may lead to some degree of breakage, particles are preferably not subjected to any deliberate comminution processes.

Preferably, the spherical and/or spheroidal particles are prepared by spray setting of a hydrosol, preferably a silica hydrosol. The resulting spherical and or spheroidal hydrogel particles are suitably subjected to washing and aging processes prior to water removal to generate suitable surface area and pore volume.

In general, the support has a specific surface area ranging from 100 to 800 m2/g, measured according to the BET volumetric method in British Standard BS 4359/1 (1984).

Preferably, the specific surface area is more than or equal to 250 m2/g or even more than or equal to 400 m2/g. The specific surface area is preferably less than or equal to 600 m2/g. Moreover, the support generally has a pore volume higher than 1 mL/g. It may also be higher than 2 mL/g and even higher than 2.5 mL/g. The term "pore volume" should be understood to mean the pore volume measured according to the nitrogen penetration method (BET) with reference to British Standard BS 4359/1 (1984).

The chromium oxide based catalyst deposited on a support used in the process according to the invention usually contains approximately 0.3 to 2% by weight, particularly 0.3 to 1.3% by weight of chromium and even more particularly 0.3 to 1% by weight of chromium, more preferably between 0.3 and 0.7% by weight of chromium, most preferably between 0.4 and 0.6% by weight of chromium (these weights being expressed with respect to the weight of final supported catalyst). Of course, it is possible to use the catalyst as a blend of 2 different or more different catalysts, at least one on them being defined as hereinabove. It is also possible to use the catalyst as a blend of 2 different or more different catalysts, this blend preferably containing a chromium loading in average defined as hereinabove.

Any known chromium containing compounds capable of reacting with the surface hydroxyl groups of the refractory oxide can be used in the process of preparation of the catalyst. Non-limiting examples of such compounds include chromium nitrate, chromium trioxide, chromate esters such as chromium acetate, chromium acetylacetonate and t-butyl chromate, silyl chromate esters and phosphorous-containing esters, chromium chloride, chromium sulphate and ammonium chromate.

The introduction mode of this chromium compound can be a dry mixing in or outside the activator or by aqueous or non-aqueous impregnation of the support.

Any known titanium containing compound capable of reacting with the surface hydroxyl groups of the refractory oxide can be used in the process of preparation of the preferred catalyst according to the present invention. These compounds include those having the structures (R)mTi(OR')n and (RO)mTi(OR')n where m is 1, 2, 3 or 4; n is 0, 1, 2 or 3 and m+n=4, and where R and R' are a C1 to C12 alkyl, aryl, cycloalkyl group, cyclopentadienyl, C2 to C12 alkenyl groups and combination thereof. These compounds also include those having the structures TiX4 wherein X is chlorine, bromine, fluorine or iodine. The titanium compound can be solid, liquid or in solution in an hydrocarbon solvent.

The introduction mode of the titanium compound can be a dry mixing in or outside the activator or an impregnation of the support with a hydrocarbon solution of the titanium compound. The catalyst used in the process according to the invention preferably contains between 0.5 and 5% by weight of titanium, most preferably between 1.5 and 4%, most preferably between 2 and 4%, most preferably between 2 and 3% (these weights being expressed with respect to the weight of final supported catalyst).

The preferred method of preparation of the catalyst used in the present invention is not important as long as it has the chromium content, the titanium content and the spherical and/or spheroidal morphology as defined hereinabove. According to the present invention the preparation of the catalyst is preferably not carried out by the cogel method. Although the support may contain small amounts of titanium, for instance as an impurity, the method of the invention involves the introduction of a titanium compound on to a support by addition and/or impregnation as defined herein in addition to any titanium contained within the support skeleton.

For the purpose of the present invention and appended claims, spheroidal shape means shaped like a sphere but not perfectly round, especially an ellipsoid shape that is generated by revolving one or more ellipse around one of its axes.

Thus, for the purpose of the present invention and appended claims, by "spherical and/or spheroidal refractory oxide", it is meant that the refractory oxide particles used for the preparation of the catalyst used in the present invention exhibit a spherical or spheroidal shape morphology. Such spherical or spheroidal morphology of said particles is usually identified by taking microscopy pictures of said particles; this is currently how the man skilled in the art can identify the presence of a spherical or spheroidal refractory oxide.

As indicated above, the initial stage according to the present invention is preferably performed under an inert atmosphere, preferably under nitrogen, more preferably under dry nitrogen. It is essential according to the present invention that the fluidisation gas velocity is controlled as indicated hereabove during the thermal treatment step(s). Any additional thermal treatment steps could also be performed before our initial stage and/or consecutive stage(s) as defined hereinabove. However, it is preferred according to the present invention that the supported chromium oxide based catalyst is not subjected to any other fluidisation to gas treatment before our initial stage and/or consecutive stage(s) as defined hereinabove.

It is also preferred according to the present invention that the step 2 of the preferred embodiment defined hereinabove is performed directly after step 1 without any additional intermediate thermal treatment step.

After our claimed consecutive fluidization stage and/or our claimed step 2 treatment, the activated catalyst is then preferably cooled with the same atmosphere from step 2 or from the consecutive stage, preferably air, to a temperature between 400° C. and 300° C. and further cooled from this temperature to room temperature with inert atmosphere, preferably nitrogen, more preferably dry nitrogen.

Also, according to the present invention, it is preferred that the total duration of any thermal treatment (non oxidising and oxidising steps) above 300° C. of our supported chromium oxide based catalyst is always less than 24 hours, preferably less than 22 hours, more preferably less 20 hours and even more preferably less than 18 hours.

It is obvious for the man skilled in the art that the thermal treatments according to the present invention can be performed continuously or in batch in any appropriate reactor. For continuous mode operations, a configuration with at least two reactors in series is preferred, one reactor operating under an inert atmosphere and one reactor operating under an oxidising atmosphere; in this preferred configuration, our stage 1 is preferably performed in the first reactor and our consecutive stage is preferably performed partly in the first reactor and partly in the second reactor.

According to an embodiment of the present invention, the thermal treatment steps are performed in batch mode in the same fluidized bed reactor.

According to another embodiment of the present invention, the step of bringing the catalyst under an inert atmosphere to a temperature comprised between 600 and 900° C. is performed by introducing the said catalyst into a reactor and gradually increasing the temperature of the reactor with a thermal speed rate comprised between 1 and 2.5° C./min until the desired temperature is reached.

According to the invention, the supported chromium catalysts having undergone the successive heat treatments in nitrogen and in air, under suitable conditions of temperature and duration, are used for the polymerization of ethylene or for its copolymerization with C3 to C12 alpha-olefins. By way of examples of olefins that can be used as comonomers, mention may be made of propylene, 1-butene, 4-methyl-1-pentene, 1-hexene, 1-octene, 1-decene, 1-dodecene, styrene, and derivatives thereof. Of course, several olefins may be used simultaneously, particularly 1-butene and/or 1-hexene and/or 1-octene.

The process according to the invention applies particularly well to the manufacture of ethylene (co-) polymers but more particularly ethylene (co-) polymers having, after compounding:

a density between 936 and 941 Kg/m3 and a MI5 between 0.5 and 1.2 dg/min and the pipes produced with this polymer meet the requirements of ISO 4427 and ISO 4437 in hydrostatic pressure testing at 20° C. and 9.0 MPa with a ductile failure at more than 100 hours, or a density between 942 and 946 Kg/m3 and a MI5 between 0.4 and 0.6 dg/min and the pipes produced with this polymer meet the requirements of ISO 4427 and ISO 4437 in hydrostatic pressure testing at 20° C. and 9.0 MPa with a ductile failure at more than 100 hours, or a density between 943 and 947 Kg/m3 and a MI5 between 0.1 and 0.4 dg/min and the pipes made from this polymer and tested in hydrostatic pressure test at 20° C. under 12.0 MPa will have a time to failure at more than 100 h, the above hydrostatic pressure testing being made following ISO1167-1 and 2.

The process according to the invention applies also particularly well to the manufacture of ethylene (co-) polymers but more particularly ethylene (co-) polymers having, after compounding:

a density between 952 and 954 Kg/m3 and a HLMI between 4 and 11 dg/min and suitable for film application and HMw blow moulding, or a density between 945 and 947 Kg/m3 and a HLMI between 4 and 11 dg/min and suitable for HMw blow moulding, or a density between 953 and 960 Kg/m3 and a MI2 between 0.2 and 0.7 dg/min and suitable for general purpose blow moulding.

The (co)polymerization is carried out, in a known manner, by bringing ethylene and, optionally, other olefins into contact with the catalyst under polymerizing conditions known per se. According to the present invention, the (co)polymerization of the ethylene is preferably carried out in the gas phase. Indeed, the Applicants have unexpectedly found that it was possible to obtain a resin product with desirable properties, e.g., sufficiently high Environmental Stress Crack Resistance (ESCR) and high Creep behaviour, with the right melt index (MI), while also achieving high catalyst activity, by using a gas phase process, in particular a fluidized bed gas phase process. Indeed, the ethylene (co)polymers is produced according to the process of the present invention exhibit an excellent compromise between processability, Environmental Stress Crack Resistance (ESCR) and creep behaviour. They may be used in any conventional process for converting thermoplastics, such as, for example, pipe extrusion, blow moulding and blown film. They are very suitable for pipe extrusion.

The present invention also provides ethylene (co-) polymers but more particularly (co-) polymers having, after compounding:

a density between 936 and 941 Kg/m3 and a MI5 between 0.5 and 1.2 dg/min and the pipes produced with this polymer meet the requirements of ISO 4427 and ISO 4437 in hydrostatic pressure testing at 20° C. and 9.0 MPa with a ductile failure at more than 100 hours, or a density between 942 and 946 Kg/m3 and a MI5 between 0.4 and 0.6 dg/min and the pipes produced with this polymer meet the requirements of ISO 4427 and ISO 4437 in hydrostatic pressure testing at 20° C. and 9.0 MPa with a ductile failure at more than 100 hours, or a density between 943 and 947 Kg/m3 and a MI5 between 0.1 and 0.4 dg/min and the pipes made from this polymer and tested in hydrostatic pressure test at 20° C. under 12.0 MPa will have a time to failure at more than 100 h, or a density between 952 and 954 Kg/m3 and a HLMI between 4 and 11 dg/min and suitable for film application and HMw blow moulding, or a density between 945 and 947 Kg/m3 and a HLMI between 4 and 11 dg/min and suitable for HMw blow moulding, or a density between 953 and 960 Kg/m3 and a MI2 between 0.2 and 0.7 dg/min and suitable for general purpose blow moulding, the above hydrostatic pressure testing being made following ISO1167-1 and 2, characterised in that the polymer is obtainable by a polymerisation process, preferably a gas phase polymerisation process, of at least one alpha olefin containing from 2 to 12 carbon atoms in the presence of a supported chromium oxide based catalyst wherein ii. the supported chromium oxide based catalyst is preferably a titanium modified supported chromium oxide based catalyst;

iii. the supported chromium oxide based catalyst has preferably a chromium content comprised between 0.3 and 2 wt %; and iv. the titanium modified supported chromium oxide based catalyst has been subjected to a thermal treatment as disclosed hereinabove.

The procedure below is intended to illustrate the process of the invention.

It depicts an activation cycle according to the present invention.

| Step | Fluid-sation gas | Fluid-ization rate cm/s | Bed temperature (° C.) | Duration (h) | Cumulated time (h) |
|---|---|---|---|---|---|
| Start | N2 | 5 | 25 | 0.0 | 0.0 |
| Heat up | N2 | 5 | 150 | 1.4 | 1.4 |
| Hold | N2 | 5 | 150 | 1.0 | 2.4 |
| Heat up | N2 | 5 | 500 | 3.9 | 6.3 |
| Vf Change | N2 | 9 | 500 | 0.0 | 6.3 |
| Heat up | N2 | 9 | 800 | 3.3 | 9.6 |
| Hold | N2 | 9 | 800 | 1.0 | 10.6 |
| Cool down | N2 | 9 | 650 | 1.7 | 12.3 |
| Gas change | Air | 9 | 650 | 0.0 | 12.3 |
| Hold | Air | 9 | 650 | 6.0 | 18.3 |
| Cool down | Air | 9 | 350 | 3.3 | 21.6 |
| Gas change | N2 | 9 | 350 | 0.0 | 21.6 |
| Cool down | N2 | 9 | 25 | 3.6 | 25.2 |

The catalyst PQC35105 which is a silica supported catalyst exhibiting a spheroidal shape has been subjected to the above activation procedure in a fluidized bed reactor.

It has subsequently been successfully used for the production of many different polyethylene grades in a fluidised bed gas phase polymerisation reactor.

Said PQC35105 catalyst is prepared by impregnating a PQ commercial silica support, MS-3050, with chromium and titanium species using non aqueous solvent. Removal of solvent by evaporation results in a catalyst composition containing 0.5% w/w chromium and 2.5% w/w titanium on a calcined (1000 C) weight basis.

The preparation and characteristics of the microspherical support MS-3050 are detailed within "*Current Achievements on Heterogeneous Olefin Polymerization Catalysts*", Sankeisha Co., Ltd, Nagoya, M. Terano, Ed., p. 57-58 (2004). The first stage is the production of spherical hydrogel particles by spray setting. These hydrogel particles are aged, washed and then subjected to solvent exchange with organic solvent and evaporation to generate spherical particles having a median particle diameter of about 90 μm measured by Malvern, surface area of about 500 m$^2$/g and pore volume of about 3.0 ml/g. Both surface area and pore volume are determined by nitrogen porosimetry. The SEM image in Figure 2a within this publication illustrates the micro spherical morphology. Said PQC35105 catalyst has, before activation, a surface area of about 470 m$^2$/g, a pore volume of about 2.70 ml/g and a median particle diameter of about 90 μm.

The invention claimed is:

1. Process for the activation of a supported chromium oxide based catalyst in a fluidised bed activation reactor which comprises a catalyst bed being fluidised by a fluidisation gas, said activation including treatment at temperatures above 500° C., wherein
   (i) in an initial stage in which there is an initial temperature increase, the fluidisation velocity (Vf1) of the fluidisation gas is maintained below 6.5 centimeters per second (cm/sec) until the temperature inside the activation reactor reaches at least 200° C., and
   (ii) said fluidisation gas is then brought to a value (Vf2) which is at least 1 cm/sec higher than Vf1.

2. Process according to claim 1 wherein the fluidisation gas velocity during the initial stage of the activation process is maintained below 5.5 cm/sec.

3. Process according to claim 1 wherein the control of the fluidisation gas velocity during the initial stage of the activation process is maintained until the temperature inside the activation reactor reaches 250° C.

4. Process according to claim 3 wherein the control of the fluidisation gas velocity during the initial stage of the activation process is maintained until the temperature inside the activation reactor reaches 400° C.

5. Process according to claim 1 wherein the fluidisation gas velocity during the initial stage of the activation process is maintained above 1.5 cm/s.

6. Process according to claim 1 wherein the fluidisation gas used during the initial stage of the activation process is selected from the group consisting of an inert gas, an oxidising gas and sequentially an inert gas followed by an oxidising gas.

7. Process according to claim 6 wherein an inert gas is used as fluidisation gas during the initial activation stage.

8. Process according to claim 1 wherein the fluidisation gas velocity Vf2 of the fluidisation gas used during the consecutive stage of the activation process is at least 1.5 cm/sec higher than Vf1.

9. Process according to claim 1 wherein the fluidisation gas used during the consecutive stage of the activation process is selected from the group consisting of an inert gas, an oxidising gas and sequentially an inert gas followed by an oxidising gas.

10. Process according to claim 1 wherein said consecutive stage includes thermal treatments with holding temperatures higher than 600° C.

11. Process according to claim 1 wherein the fluidisation gas velocity Vf2 is at least 6 cm/s.

12. Process according to claim 1 wherein the fluidisation gas velocity Vf2 is maintained below 12 cm/s.

13. Process according to claim 1 wherein the duration of the initial fluidisation stage lasts at least 10 minutes.

14. Process according to claim 1 wherein the duration of the consecutive fluidisation stage lasts at least 10 minutes.

15. Process according to claim 1 wherein the consecutive stage comprises at least two separate thermal treatment steps wherein
   the first step consists in bringing the catalyst from the initial stage under an inert atmosphere to a temperature comprised between 600 and 900° C. and then keeping the catalyst during a holding time of less than or equal to 8 hours under an inert atmosphere at a temperature comprised between 600 and 900° C., and
   the second step consists in the treatment of the catalyst coming from step 1 under an oxidizing atmosphere at a temperature comprised between 400 and 700° C. during a holding time comprised between 2 and 10 hours, and
   wherein the maximum temperature of step 2 is always lower than the maximum temperature of step 1 and wherein the difference between the maximum temperature of step 1 and the maximum temperature of step 2 is comprised between 50 and 250° C.

16. Process according to claim 1 wherein the supported chromium oxide based catalyst is a titanium modified supported chromium oxide based catalyst.

17. Process according to claim 1 wherein the catalyst support is a refractory oxide support selected from the group consisting of silica, alumina, aluminophosphate, metal oxides, and combinations thereof.

18. Process according to claim 1 wherein the catalyst support is a spherical and/or spheroidal refractory oxide support.

19. Process according to claim 1 wherein the chromium oxide based catalyst contains 0.3 to 2% by weight of chromium (this weight being expressed with respect to the weight of final supported catalyst).

20. Process according to claim 1 wherein the chromium oxide based catalyst contains between 0.5 and 5% by weight of titanium (this weight being expressed with respect to the weight of final supported catalyst).

21. Process according to claim 1 wherein the supported chromium oxide based catalyst is not subjected to any other fluidisation gas treatment before the initial claimed stage and/or consecutive claimed stage(s).

22. Activated supported chromium oxide based catalyst obtained according to claim 1.

23. Process according to claim 1 wherein the fluidisation gas velocity (Vf2) is at least 7 cm/sec.

24. Process according to claim 1 wherein the duration of the initial fluidisation stage lasts at least 1 hour.

25. Process according to claim 1 wherein the duration of the consecutive fluidisation stage lasts at least 1 hour.

* * * * *